Figure 1:
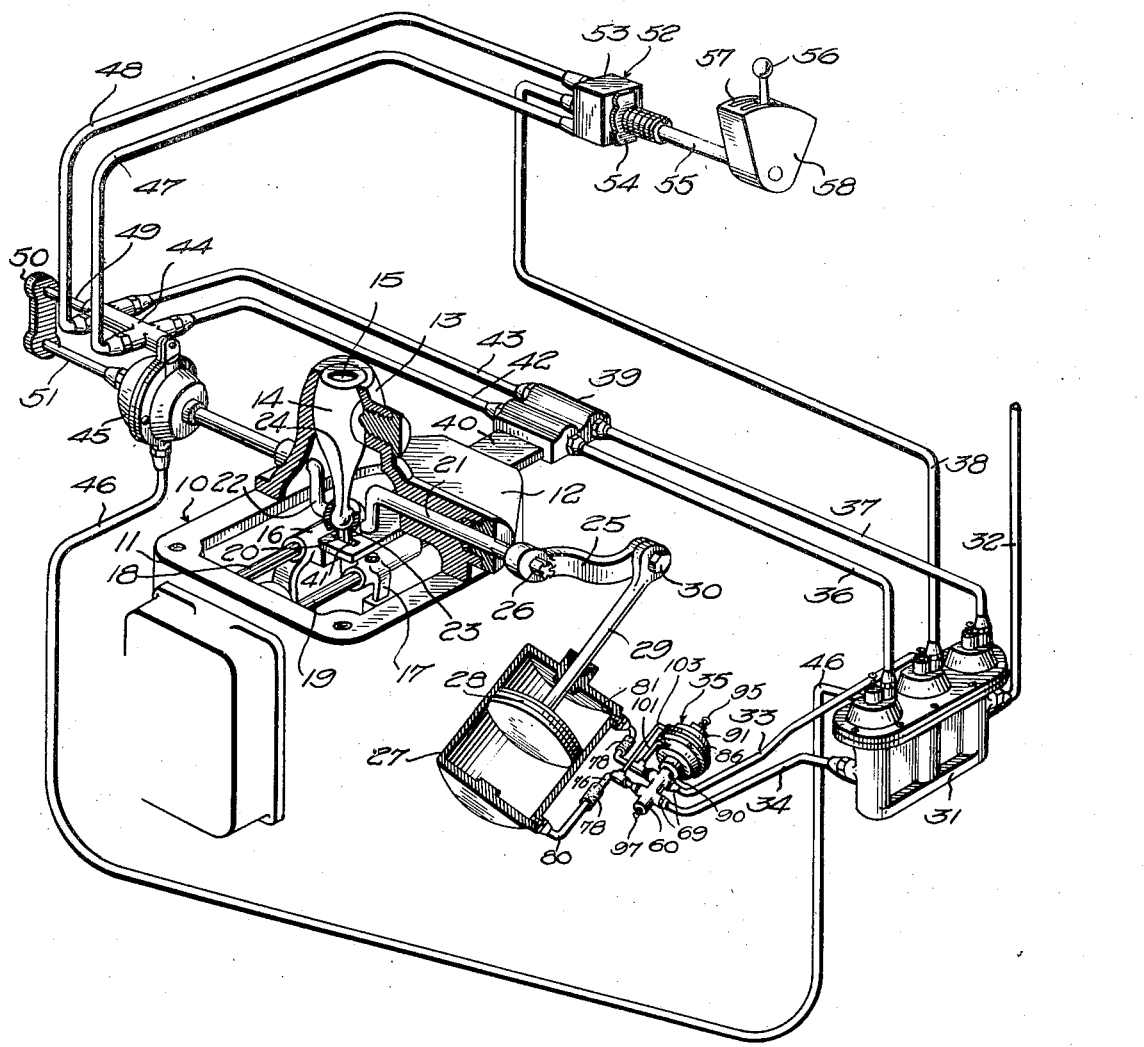

Oct. 3, 1939.   H. W. HEY   2,175,152
GEAR SHIFTING MECHANISM FOR MOTOR VEHICLES
Filed July 30, 1936   2 Sheets-Sheet 1

Inventor
HENRY W. HEY
By [signature]
Attorney

Patented Oct. 3, 1939

2,175,152

UNITED STATES PATENT OFFICE 2,175,152

GEAR SHIFTING MECHANISM FOR MOTOR VEHICLES

Henry W. Hey, Richmond, Va., assignor to Automatic Shifters, Inc., Richmond, Va., a corporation of Virginia Application July 30, 1936, Serial No. 93,472

28 Claims. (Cl. 74—334)

This invention relates to gear shifting mechanisms for motor vehicles, and is an improvement over the structure disclosed in the prior patent of Edward G. Hill and Henry W. Hey, No. 2,030,838, granted February 11, 1936.

There have been numerous developments in the art of power shifting mechanisms for motor vehicle transmissions, such mechanisms commonly employing differential pressure operated motors for effecting the shifting operation, together with suitable valve mechanisms for controlling the operation of the shifting motors. For example, in Patent No. 2,030,838, referred to above, a differential pressure motor is employed for effecting the longitudinal shifting action, and a "cross-over" motor is employed for effecting transverse movement of the shifting lever to determine which side of the gear set shall be rendered operative. Each motor is provided with suitabe control valves, which are operable by a selector lever arranged adjacent the steering wheel of the vehicle.

The general mode of operation of the apparatus of the patent referred to is followed out in my copending application Serial No. 64,948, filed February 20, 1936, and in the copending applications of Edward G. Hill and Henry W. Hey Serial No. 43,104, filed October 1, 1935, and 61,222 filed January 28, 1936. In the mechanisms of the prior patent and pending applications referred to, the selector is operated to determine which side of the gear set shall be rendered operative and the selector further determines the direction of longitudinal shifting whereby a predetermined gear may be selected for operation.

The prior mechanisms referred to operate perfectly for effecting shifting movement in conventional transmissions of the type wherein the gears are moved longitudinally into meshing relationship without the use of means for synchronizing the speed of rotation of the gears. However, it is desired that the longitudinal shifting movement be controlled to provide a proper longitudinal shifting action when the apparatus is used in conjunction with non-clashing synchronized transmissions.

In this connection, it is pointed out that in the conventional shifting of such transmissions by hand, it is the common practice for a motor vehicle operator to move the gear shift lever out of a gear position and through neutral position, and then to retard the manual shifting movement to allow sufficient time for the synchronization of the selected gears to take place. This operation is performed subconsciously by most drivers, and the retarding of the motion of the gear shift lever takes place at the point where the movement of the gear shift lever encounters the resistance offered by the synchronizing clutches or corresponding devices.

An important object of the present invention is to provide a gear shifting mechanism having automatic means for controlling the shifting operation to permit proper synchronization of the selected gears to take place before the final shifting movement into the selected position.

A further object is to provide novel means in an apparatus of this character which is responsive to the increased resistance offered by the synchronizing means, for retarding the shifting action to delay the final shifting movement and thus permit proper synchronization of the selected gears to take place.

A further object is to provide such an automatic apparatus wherein a pressure sensitive device is responsive to the resistance offered by the synchronizing means, to control the shifting action for the purpose stated.

A further object is to provide a differential pressure motor for effecting the longitudinal shifting movement of the transmission elements, and to provide a control device sensitive to changes in the differential pressure in said motor incident to the resistance offered by the transmission synchronizing means, for controlling the operation of the shifting motor.

A further object is to provide a control mechanism of the character indicated, wherein the extent to which the operation of the shifting motor is retarded may be readily adjusted according to the particular transmission with which the apparatus is employed.

Other objects and advantages of the invention will become apparent during the course of the following description.

Figure 2:
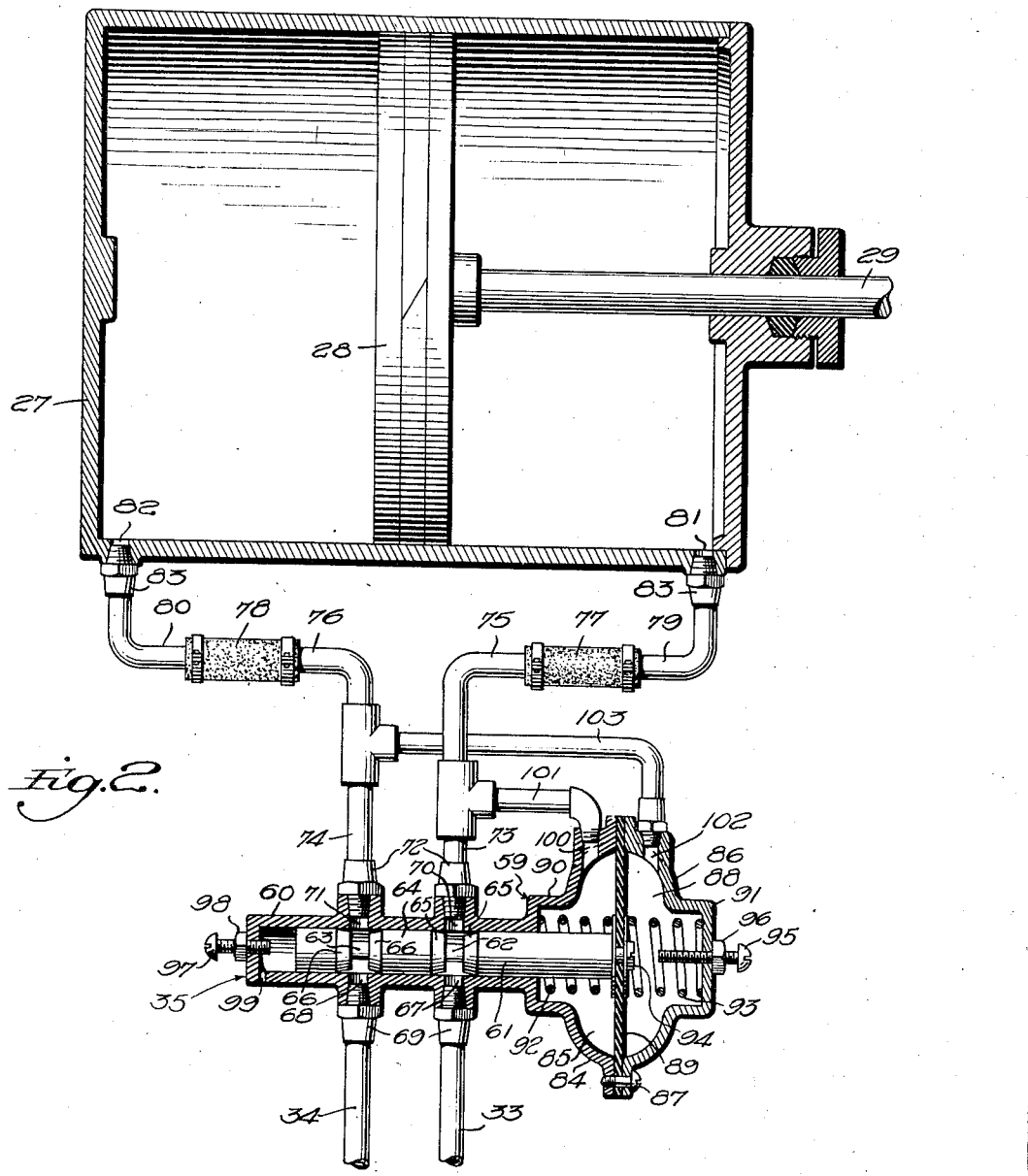

In the drawings I have shown one embodiment of the invention. In this showing:

Figure 1 is a fragmentary perspective view of a portion of a motor vehicle gear set, showing the power shifting means associated therewith, parts being broken away, and, Figure 2 is an enlarged sectional view through the longitudinal shifting motor and automatic control valve therefor, parts being shown in elevation.

Referring to Figure 1, the numeral 10 designates a motor vehicle gear set as a whole, it being understood that such gear set is of the synchronizing type, such, for example, as the type which includes synchronizing clutches engageable for synchronizing selected gears of the transmission in order that such gears may mesh without clashing. The gear set comprises a casing 11 having a cover plate 12 provided with the usual tower 13. This tower provides a universal support for a shifting lever 14, and the lever 14 is provided in its upper end with a socket 15 adapted to receive the lower end of a manually operable shifting handle.

The transmission is provided with the usual shift forks 16 and 17, carried respectively by the usual shift rods 18 and 19. A finger 20 depends from the lower end of the lever 14 and determines which of the shift rods 18 or 19 will be moved longitudinally, depending up the lateral position of the finger 20, as will be understood.

A shaft 21 extends transversely through the top of the transmission and is provided intermediate its ends with a crank 22 having a socket 23 engaging a ball 24, carried by the lower portion of the lever 14. The rocking of the shaft 21 transmits longitudinal movement to one of the shift rods, and either shift rod may be selected for operation by sliding the shaft 21 axially, in a manner to be described.

A crank 25 is splined as at 26 on one end of the shaft 21 to permit axial movement of the shaft with respect to the arm 25. A differential pressure motor is adapted to transmit movement to the crank arm 25. This motor includes a cylinder 27 having a piston 28 reciprocable therein and provided with a piston rod 29 connected as at 30 to the free end of the crank arm 25. Any suitable means may be provided for supporting the shifting motor to permit the slight necessary variation in the position thereof incident to the swinging movement of the arm 25.

In the present instance, the shifting motor 27 is intended to be vacuum operated, and the intake manifold of the motor vehicle preferably constitutes the source of differential pressure. A main valve mechanism indicated as a whole by the numeral 31 is adapted to control the application of atmospheric pressure and vacuum to opposite ends of the cylinder 27, such valve mechanism being connected to the source of vacuum by a pipe 32. Control pipes 33 and 34 are connected at one end to the valve mechanism 31 and communicate in a manner to be described with opposite ends of the cylinder 27, communication through the pipes 33 and 34 being controlled by an automatic valve mechanism indicated as a whole by the numeral 35, which will be referred to in detail later.

Three pipes 36, 37 and 38 lead to the valve mechanism 31 to control the operation of the valves therein. The pipes 36 and 37 lead to a valve device 39, operable by a slide 40 extending into the transmission and provided at its inner end with a slot 41 through which the finger 20 extends. The slot 41 is arranged transversely of the transmission to permit axial sliding movement of the shaft 21 without affecting the slide 40, this element being moved upon actuation of the motor piston 28 to control the valve device 39 in the manner fully disclosed in Patent No. 2,030,838 referred to above.

The pipes 36 and 37 communicate through the valve device 39 with pipes 42 and 43, respectively, leading to a valve device 44 which operates in the manner disclosed in the patent referred to, to permit gear preselection and to act as an "interlock" to prevent the piston 28 from moving out of a gear position and then back into the same gear position without having moved to neutral position to permit the crossover action to take place when the next selected gear position requires such operation.

For convenience, the valve device 44 is supported by a crossover motor 45 having a movable element (not shown) operable by differential pressure and connected to the adjacent end of the shaft 21. Pressure in the motor 45 is determined by a pipe 46 leading to the valve mechanism 31, the pressure in the pipe 46 being controlled, in turn, in accordance with the controlling of the pressure in the pipe 38, in a manner to be described.

The pipes 42 and 43 are adapted to communicate respectively with the pipes 47 and 48, repending upon the operation of the valve device 44, such valve device having one valve member responsive to differential pressures in the motor 45, and a second valve member operative by the movable element of the motor 45 through a stem 49, crosshead 50 and shaft 51. The operation of this mechanism is fully described in the patent referred to, although a complete operative transmission mechanism may be provided without the "preselecting" and "interlocking" features by eliminating the valve 44 and connecting the pipes 42 and 43 to the respective pipes 47 and 48.

The three pipes 38, 47 and 48 lead to a selector valve mechanism indicated as a while by the numeral 52. Such mechanism comprises a valve casing 53, a valve 54 and an operating shaft 55, all of which elements are fully described in prior Patent No. 2,030,838, referred to above. The shaft 55 is adapted to be rocked to open either of the pipes 47 or 48 to the atmosphere, and for this purpose, the shaft 55 is provided with an operating handle 56 constituting the manual selector. This handle is shown as being operable in an H-slot 57 formed in the arcuate upper face of a segmental housing 58. When the handle 56 is rocked to turn the shaft 55 about its axis, one of the pipes 47 or 48 may be opened to the atmosphere, or both closed to the atmosphere, while lateral movement of the handle 56 to move the shaft 55 axially, determines the connection of the pipe 38 to the atmosphere. All of these operations likewise are fully disclosed in the prior patent referred to.

The valve mechanism 35 is shown in detail in Figure 2 of the drawing. Such device comprises a preferably integral housing indicated as a whole by the numeral 59, one end of such housing forming a valve cylinder 60 in which is arranged a valve 61. The valve is provided with a pair of reduced portions 62 and 63 having a land 64 therebetween. The valve 61 is provided on opposite sides of the reduced portions 62 and 63 with respective tapered portions 65 and 66, for a purpose to be described.

The valve cylinder 60 is provided at one side with a pair of ports 67 and 68 connected by unions 69 to the respective pipes 33 and 34. At preferably diametrically opposite points, the valve cylinder 60 is provided with a pair of similar ports 70 and 71, respectively arranged in the transverse planes of the ports 67 and 68. When the valve 61 is in the position shown in Figure 2, therefore, the pipes 33 and 34 have unrestricted communication with the respective ports 70 and 71, and these ports are connected by unions 72 to pipes 73 and 74 respectively.

The pipes 73 and 74 are provided respectively with ends 75 and 76 facing toward opposite ends of the motor cylinder 27. These pipe ends are connected by flexible rubber or similar tubes 77 and 78 to pipes 79 and 80, the ends of which turn inwardly toward the respective ends of the cylinder 21. The ends of the cylinder 27 are ported as at 81 and 82 respectively, and the ports are connected by unions 83 to the respective pipes 79 and 80. The flexible tubes 77 and 78 are obviously provided to permit the slight swinging movement of the cylinder 27 incident to the swinging movement of the arm 25, the cylinder 27 being supported in any suitable manner to permit such movement to take place.

The valve casing 59 is provided at one end with a circular enlargement 84 forming a chamber 85, and a cap 86, similar in shape to the enlargement 84, is secured to the latter as at 87 and forms a second chamber 88. A diaphragm 89 is clamped between the members 84 and 86 and forms an elastic partition between the chambers 85 and 88. The members 84 and 86 are provided respectively with integral axial extensions 90 and 91 to receive springs 92 and 93 respectively. These springs are relatively high-powered limited-movement compression springs, and they preferably reach their limit of expansion when the diaphragm 89 is in the position shown in Figure 2.

Obviously the springs 92 and 93 oppose deflection of the diaphragm 89 in either direction from its normal position shown in Figure 2. The diaphragm 89 is secured to the adjacent end of the valve 61 by a screw 94, and a limiting screw 95 is engageable with the head of the screw 94 to limit the movement of the valve 61 upon compression of the spring 93. The screw 95 may be fixed in adjusted position by a lock nut 96. The end of the valve cylinder 60 remote from the diaphragm 89 is provided with a similar limiting screw 97, fixed in adjusted position by a lock nut 98, and engageable with the adjacent end of the valve 61 to limit the movement of this valve upon compression of the spring 92. The end of the valve cylinder is provided with a vent opening 99 to prevent the entrapment of air in the end of the valve cylinder.

The chamber 85 communicates through a port 100 with a pipe 101 connected to the pipe 73. Similarly, the cap 86 is provided with a port 102 affording communication between the chamber 88 and a pipe 103 connected to the pipe 74. Accordingly the pressures in the pipes 73 and 74 are communicated to the respective chambers 85 and 88, thus influencing the position of the diaphragm 89.

The operation of the apparatus is as follows:

The operation of the apparatus, except for the valve mechanism 35, corresponds with the operation fully disclosed in Patent No. 2,030,838 previously referred to, and need not be described in detail. The perspective showing in Figure 1 is taken looking toward the forward end of the vehicle, and since the selector handle 56 is adapted to assume positions corresponding to the positions of a conventional gear shift lever, the selector handle is moved toward the left and rearwardly for low gear position. Such operation of the selector handle opens the pipe 38 to the atmosphere, whereupon the crossover motor 45 will be energized to slide the shaft 21 toward the right to engage the finger 20 with the fork 17. At the same time, the rearward movement of the selector handle 56 opens the pipe 48 to the atmosphere and maintains the pipe 47 closed to the atmosphere. Under such conditions the valve mechanism 31 will function to connect the pipe 34 to the atmosphere and the pipe 33 to the intake manifold or other source of vacuum. The valve 61 will be in its normal position shown in Figure 2 affording communication between the pipes 33 and 73 and between the pipes 34 and 74. Accordingly the forward end of the cylinder 27 will be connected to the intake manifold while the rear end of the cylinder will be connected to the atmosphere. Thus the piston 28 will move forwardly to turn the arm 25 in a counter-clockwise direction, thus shifting the fork 17 forwardly and placing the gear set in low gear position.

As previously stated, the present construction is particularly intended for use in connection with synchronizing transmissions, for example, the type of transmission employing clutches for synchronizing the speed of a pair of gears before they are brought into mesh to prevent the clashing of such gears. Without the use of the valve mechanism 35, the piston 28, when moving into low gear in the manner described, will move continuously at a relatively high speed to the forward end of the cylinder 27, and the meshing of the gears will take place before the speed of the gears has been synchronized. Accordingly the value of a transmission of this character is greatly minimized, the gears sometimes clashing in the same manner as if no synchronizing means were employed. This is particularly true when shifting from high gear into second gear.

The valve mechanism 35 functions to automatically simulate manual shifting, wherein the operator ordinarily retards the movement of the gear shift lever when passing through the range of movement in which gear synchronization takes place. As previously stated, atmospheric pressure is present in the rear end of the cylinder 27 when moving into low gear position, while the forward end of the cylinder 27 is connected to the intake manifold. Such respective pressures are communicated to the cylinder 27 through the pipes 74 and 73 respectively, and these pipes communicate with the respective chambers 88 and 85. Accordingly it will be apparent that the chambers referred to are affected by the pressures present in opposite ends of the cylinder 27.

Initial movement of the piston 28 takes place relatively freely since there is negligible resistance to its movement, and accordingly such initial movement of the piston takes place upon a relatively slight reduction in pressure in the forward end of the cylinder 27. The forward end of the cylinder 27 is the right hand end as viewed in Figure 2, and the initial relatively slight pressure reduction in such end of the cylinder is communicated to the chamber 85 in the manner stated, thus moving the diaphragm 89 and valve 61 toward the left. The movement referred to is insufficient to reduce communication between the pipes 33 and 73 and between the pipes 34 and 74.

As previously stated, the piston 28 moves relatively freely through its initial stage and since the piston is of substantial area, it tends to satisfy the exhaustion of air in the forward end of the cylinder 27, thus preventing a substantial reduction in pressure therein so long as free movement of the piston 28 continues. However, the movement of the piston is resisted to a noticeable extent when movement is transmitted to the synchronizing means of the transmission, and upon encountering such resistance to the movement of the piston 28, an immediate reduction in pressure will occur in the forward end of the cylinder 27, and such reduction in pressure will be communicated to the chamber 85. Since atmospheric pressure is present in the chamber 88, a sufficient differential pressure will be established on opposite sides of the diaphragm 89 to move the valve 61 to its left hand limit of movement against the pressure of the spring 92.

The movement of the valve 61 is limited by the screw 97, and this screw may be adjusted to any desired extent. Upon movement of the valve 61 in the manner described, the reduced portions 62 and 63 of the valve 61 will move out of registration with their respective ports of the valve cylinder 60, whereupon communication between the pipes 33 and 73 and between the pipes 34 and 74 will be limited by the reduced communication afforded around the tapered valve portions 65 and 66. This reduced communication may be determined by the position of the tapered valve portions with respect to the ports of the valve casing 60, as will be apparent, and this valve position is determined by the adjustment of the screw 97.

When the valve 61 functions in the manner stated to reduce communication between the ends of the cylinder 27 and the source of vacuum and the atmosphere, air will be admitted very slowly into the rear end of the cylinder 27 and will be exhausted very slowly from the forward end thereof. Under such conditions the piston 28 will be caused to materially reduce its speed of movement through that portion of its travel in which gear synchronization takes place, thus permitting the gears to be properly synchronized before meshing. Obviously, the differential pressure on opposite sides of the piston 28 will not be destroyed, and the piston will continue its retarded movement until synchronization has taken place, beyond which point the piston 28 is again free to move with negligible resistance. The speed of the piston movement thereupon automatically increases and again more completely tends to satisfy the exhaustion of air from the forward end of the cylinder 27, whereupon there will be an instantaneous reduction in the differential pressure on opposite sides of the piston 28. This reduction in differential pressure is due to movement of the piston 28 toward the end of the cylinder from which air is being slowly exhausted, and the movement of the piston increases the capacity of the left hand end of the cylinder 27 to which air is being very slowly admitted.

In connection with the foregoing operation, it is particularly pointed out that when movement of the piston 28 takes place prior to operation of the synchronizing clutches, the resistance to the movement of the piston is substantially negligible, and accordingly the piston responds to relatively slight differential pressures on opposite sides thereof. When the resistance of the synchronizing means is encountered, the piston 28 is immediately retarded in its movement, and the momentary continued admission of air through port 82 and the exhaustion of air through port 81 immediately increases the differential pressures on opposite sides of the piston 28. It is this increase in differential pressure which affects the diaphragm 89 to restrict communication through pipes 73 and 74.

Thus it will be apparent that as soon as the piston 28 has passed the stage in which its movement is resisted, it will again be free to move, and since substantially greater differential pressures exist on opposite sides of the piston than were present during free movement of the piston prior to encountering the resistance of the synchronizing means, the piston will start to move quite rapidly. This rapid movement of the piston, after synchronization has taken place, occurs with communication through the pipes 73 and 74 restricted and accordingly the rapid movement of the piston reduces the volume of the cylinder forwardly of the piston to increase the pressure therein, and at the same time increases the volume of the rear end of the cylinder to decrease the pressure therein. Accordingly, there will be a decrease in the differential pressures on opposite sides of the piston 28, and these pressures react in the chambers 85 and 88 to restore the normal position of the valve 61.

Thus it will be apparent that when the rate of movement of the piston 28 increases after gear synchronization has taken place, there will be an increase in pressure in the forward end of the cylinder 27, which will be communicated to the chamber 85, and at the same time, there will be a reduction in pressure in the left hand end of the cylinder 27 which will be communicated to the chamber 88. The differential pressure which has previously moved the diaphragm 89 and valve 61 to their left hand limits of movement accordingly will be reduced, and the spring 92 will function to move the diaphragm 89 toward the right as viewed in Figure 2 to restore normal communication between the pipes 33 and 73 and between the pipes 33 and 74, thus increasing the speed of movement of the piston 28 to its limit of movement with the gear set in low gear position.

The clutch is then engaged and the throttle opened to accelerate the vehicle speed in the usual manner, whereupon the clutch may be disengaged and the gear set may be moved to the second gear position. The valve mechanism 44 permits preselection to take place, but the valve mechanism 35 functions in the same manner regardless of whether the gears are preselected or shifting of the selector handle 56 takes place after the clutch is released. Assuming that the clutch is released after acceleration has taken place to the desired extent in low gear, the selector handle is moved forwardly to neutral position, then transversely, and then forwardly into the second gear position. When the neutral position is reached, the motor 45 then functions to transfer the shift to the high gear side of the gear set by moving the finger 20 into engagement with the fork 16.

Under such conditions the valve mechanism 31 will reverse the previously described operation, the forward end of the cylinder being connected to the atmosphere and the rear end to the source of vacuum. The piston 28 then moves from the forward end of the cylinder slightly past the center of the length of the cylinder 27 before the resistance of the synchronizing means for second gear is encountered. During such movement of the piston 28, negligible resistance to the movement of the parts will be encountered, and the changes in the differential pressures in the chambers 85 and 88 will be insufficient to materially affect the position of the valve 61 for the reasons explained in connection with the movement of the gear set to low gear position. However, when the piston 28, in its rearward movement, encounters the resistance offered by the synchronizing means for second gear, there will be an immediate drop in pressure in the rear end of the cylinder 27, which will be communicated to the chamber 88. Since the chamber 85 communicates with the forward end of the cylinder 27, such chamber will be influenced by atmospheric pressure.

Upon the substantial change in differential pressure in the chambers 85 and 88, incident to the resistance of the movement of the piston 28 when the second gear synchronizing means is operated, the diaphragm 89 and valve 61 will promptly move to their right hand limit of movement as viewed in Figure 2. The reduced valve portions 62 and 63 will move out of registration with their respective ports in the valve cylinder 60, whereupon communication of the ends of the cylinder 27 with the source of vacuum and the atmosphere will be limited as determined by the two left hand tapered valve portions 65 and 66. The degree of communication around such valve portions obviously may be determined by the setting of the screw 95.

Accordingly it will be apparent that when the resistance of the second gear synchronizing means is encountered, the communication of the rear end of the cylinder with the source of vacuum and the communication of the forward end of the cylinder with the atmosphere will be materially restricted, thus retarding the movement of the piston 28 until synchronization has taken place, whereupon normal conditions will be restored in the same manner as described in connection with the shift into low gear. After synchronization has taken place in second gear, the remainder of the shifting movement will take place very rapidly with the gears properly synchronized, the valve 61 being restored to its normal position as soon as the piston 28 has passed the resisting influence of the synchronizing means.

It will be obvious that the valve mechanism 35 functions in the same manner for all gear positions in which gear synchronization is intended to take place prior to the meshing of the gears. In other words, the valve 61 functions in the same manner regardless of its direction of movement according to the selected gear position, and accordingly the present apparatus is particularly valuable for use with synchronizing transmissions since it automatically permits the proper functioning of the synchronizing means. The adjustment of the screws 95 and 97 determines the speed with which the piston 28 will move past the gear synchronizing points, and accordingly the gears may be properly shifted with no skill on the part of the operator. As a matter of fact, the present apparatus will operate to provide more skillful gear shifting than is practiced by the average driver, many drivers not being familiar with the functioning of the synchronizing means in transmissions of this character.

The valve mechanism 35 is not dependent for its operation on the particular form of valve mechanism 31 as disclosed in the Hill and Hey Patent No. 2,030,838, but will operate in conjunction with any valve mechanism which controls communication between the pipes 33 and 34 and the atmosphere and source of vacuum. However, the use of the valve mechanism 35 with the particular valve mechanism 31 is preferred because of the extremely rapid shifting operation provided by the valve mechanism 31. Such mechanism provides such extremely rapid operation of the piston when the valve mechanism 35 is not functioning, that the functioning of the latter valve does not seriously affect the total time required for effecting the shift from one gear position to another. It will be apparent that the valve mechanism 35 functions automatically upon the operation of the gear synchronizing means and automatically ceases to function as soon as gear synchronization has taken place. Accordingly lost motion is completely eliminated, the movement of the piston 28 being retarded only during the exact period in which a retarded movement of the piston is desired. Moreover, the exact extent to which movement of the piston is retarded may be accurately determined by the simple adjustment of the screws 95 and 97.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A shifting mechanism for a synchronizing motor vehicle transmission, comprising a power operated shifting mechanism, and means automatically responsive to the operation of the synchronizing means of the transmission for reducing the power of said power operated mechanism for checking the speed of the shifting operation.

2. A shifting mechanism for a synchronizing motor vehicle transmission, comprising a power operated shifting mechanism, and means responsive to the resistance against the shifting operation, incident to initial operation of the synchronizing means of the transmission, for reducing the power of said power operated mechanism for checking the speed of the shifting operation.

3. A shifting mechanism for a synchronizing motor vehicle transmission, comprising a power operated shifting mechanism, and automatic means operative upon initial operation of the synchronizing means of the transmission for reducing the power of said power operated mechanism for delaying the completion of the shifting operation.

4. A shifting mechanism for a synchronizing motor vehicle transmission, comprising a power operated shifting mechanism, and means automatically responsive to the operation of the synchronizing means of the transmission for reducing the power of said power operated mechanism for delaying the completion of the shifting operation.

5. A shifting mechanism for a synchronizing motor vehicle transmission, comprising a power operated shifting mechanism, and a control device connected to control said shifting mechanism and having a member automatically movable upon initial operation of the synchronizing means of the transmission for reducing the power of said power operated mechanism for checking the speed of the shifting operation.

6. A shifting mechanism for a synchronizing motor vehicle transmission, comprising a fluid pressure operated shifting mechanism, control valve means for said mechanism, and auxiliary means controlling said mechanism by reducing the power of such mechanism for checking the speed of the shifting operation during the stage of shifting in which synchronization takes place.

7. A shifting mechanism for a synchronizing motor vehicle transmission, comprising a fluid pressure operated shifting mechanism, control valve means for said mechanism, and auxiliary means controlling the application of fluid pressures to said mechanism for checking the speed of the shifting operation during the stage of shifting in which synchronization takes place.

8. A shifting mechanism for a synchronizing motor vehicle transmission, comprising a fluid pressure operated shifting mechanism, control valve means for said mechanism, and a valve device responsive to the operation of the synchronizing means of the transmission for checking the speed of the shifting operation.

9. A shifting mechanism for a synchronizing motor vehicle transmission, comprising a fluid pressure operated shifting mechanism, control valve means for said mechanism, and a valve device responsive to the operation of the synchronizing means of the transmission for controlling the application of fluid pressures to said mechanism.

10. A shifting mechanism for a synchronizing motor vehicle transmission, comprising a fluid pressure operated shifting mechanism, control valve means for said mechanism, and means responsive to the resistance against shifting operation incident to initial operation of the synchronizing means of the transmission for reducing the power of said fluid pressure operated mechanism for checking the speed of operation of said mechanism.

11. A shifting mechanism for a synchronizing motor vehicle transmission, comprising a fluid pressure operated shifting mechanism, control valve means for said mechanism, and means responsive to the resistance against the shifting operation incident to initial operation of the synchronizing means of the transmission, for controlling the application of fluid pressures to said mechanism.

12. A shifting mechanism for a synchronizing motor vehicle transmission, comprising a fluid pressure motor for effecting the shifting operation, control valve mechanism for said motor, and auxiliary valve means controlling said motor to check the speed of the shifting operation during the stage of shifting in which synchronization takes place.

13. A shifting mechanism for a synchronizing motor vehicle transmission, comprising a fluid pressure motor for effecting the shifting operation, control valve mechanism for said motor, and a valve device for controlling the application of fluid pressures to said motor independently of said control valve mechanism to check the speed of the shifting operation during the stage of shifting in which synchronization takes place.

14. A shifting mechanism for a synchronizing motor vehicle transmission, comprising a fluid pressure motor for effecting the shifting operation, control valve mechanism for said motor, and a valve device automatically responsive to the operation of the synchronizing means of the transmission for controlling the speed of operation of said motor.

15. A shifting mechanism for a synchronizing motor vehicle transmission, comprising a fluid pressure motor for effecting the shifting operation, control valve mechanism for said motor, and a valve device automatically responsive to the operation of the synchronizing means of the transmission for controlling the application of fluid pressures to said motor to delay the completion of the shifting operation.

16. A shifting mechanism for a synchronizing motor vehicle transmission, comprising a fluid pressure motor for effecting the shifting operation, control valve mechanism for said motor, and a valve device connected for utilizing the resistance against the shifting operation, incident to initial operation of the synchronizing means of the transmission, for checking the speed of operation of said motor.

17. A shifting mechanism for a synchronizing motor vehicle transmission, comprising a fluid pressure motor for effecting the shifting operation, control valve mechanism for said motor, and a valve device responsive to the resistance against the shifting operation, incident to initial operation of the synchronizing means of the transmission, for restricting the application of fluid pressures to said motor.

18. A shifting mechanism for a synchronizing motor vehicle transmission, comprising a fluid pressure motor for effecting the shifting operation, control valve mechanism for said motor, fluid connections between said control valve mechanism and said motor, and means for restricting communication through said connections during the stage of gear shifting in which synchronization takes place.

19. A shifting mechanism for a synchronizing motor vehicle transmission, comprising a fluid pressure motor for effecting the shifting operation, control valve mechanism for said motor, fluid connections between said control valve mechanism and said motor, and means automatically responsive to the operation of the synchronizing means of the transmission for restricting communication through said connections.

20. A shifting mechanism for a synchronizing motor vehicle transmission, comprising a fluid pressure motor for effecting the shifting operation, control valve mechanism for said motor, fluid connections between said control valve mechanism and said motor, and means connected for utilizing the resistance against the shifting operation, incident to initial operation of the synchronizing means of the transmission, for restricting communication through said connections.

21. A shifting mechanism for a synchronizing motor vehicle transmission, comprising a fluid pressure motor for effecting the shifting operation, control valve mechanism for said motor, a valve device operative for controlling the application of fluid pressures to said motor independently of said control valve mechanism, and means for rendering said valve device operative in accordance with predetermined changes in fluid pressures in said motor.

22. A shifting mechanism for a synchronizing motor vehicle transmission, comprising a fluid pressure motor for effecting the shifting operation, control valve mechanism for said motor, a valve device operative for controlling the application of fluid pressures to said motor independently of said control valve mechanism, a fluid pressure operated element connected to said valve device, and a pair of pressure chambers in pressure influencing relationship with said element and communicating with opposite ends of said motor.

23. A shifting mechanism for a synchronizing motor vehicle transmission, comprising a fluid pressure motor for effecting the shifting operation, control valve mechanism for said motor, a valve device operative for controlling the application of fluid pressures to said motor independently of said control valve mechanism, a pair of chambers, a pressure movable element dividing said chambers and connected to said valve device, and means biasing said valve device to inoperative position, said chambers communicating with the respective ends of said motor to be influenced by pressures therein.

24. A shifting mechanism for a synchronizing motor vehicle transmission, comprising a fluid pressure motor for effecting the shifting operation, control valve mechanism for said motor, fluid connections between said control valve mechanism and said motor, a normally inoperative valve movable to operative position to restrict communication through said connections, and a fluid pressure operated device connected to said valve and responsive to predetermined changes in the pressures in said motor for rendering said device operative.

25. A shifting mechanism for a synchronizing motor vehicle transmission, comprising a fluid pressure motor for effecting the shifting operation, control valve mechanism for said motor, fluid connections between said control valve mechanism and said motor, a normally inoperative valve movable to operative position for restricting communication through said connections, a pair of pressure chambers communicating with the respective ends of said motor, and a flexible diaphragm dividing said chambers and connected to said valve.

26. A shifting mechanism for a synchronizing motor vehicle transmission, comprising a fluid pressure motor for effecting the shifting operation, control valve mechanism for said motor, fluid connections between said control valve mechanism and said motor, a valve casing in said connections having ports affording unrestricted communication therethrough, a valve having ports normally affording unrestricted communication between the ports of said valve casing, and fluid pressure operated means responsive to predetermined variations in the pressures in said motor for rendering said valve operative to restrict communication through said connections.

27. A shifting mechanism for a synchronizing motor vehicle transmission, comprising a fluid pressure motor for effecting the shifting operation, control valve mechanism for said motor, fluid connections between said control valve mechanism and said motor, a slide valve having ports normally affording unrestricted communication through said connections and operative for restricting communication through said connections, said valve having tapered portions determining the extent of the restriction of communication between said passages, and means responsive to predetermined variations in the fluid pressures in said motor for rendering said valve operative.

28. A shifting mechanism for a synchronizing motor vehicle transmission, comprising a fluid pressure motor for effecting the shifting operation, control valve mechanism for said motor, fluid connections between said control valve mechanism and said motor, a slide valve having ports normally affording unrestricted communication through said connections and operative for restricting communication through said connections, said valve having tapered portions determining the extent of the restriction of communication between said passages, means responsive to predetermined variations in the fluid pressures in said motor for rendering said valve operative, and adjusting means for determining the positions of said tapered valve portions with respect to said valve casing ports when said slide valve is operative.

HENRY W. HEY.

DISCLAIMER 2,175,152.—*Henry W. Hey*, Richmond, Va. GEAR SHIFTING MECHANISM FOR MOTOR VEHICLES. Patent dated October 3, 1939. Disclaimer filed January 9, 1942, by the assignee, *Automatic Shifters, Inc.*

Hereby enters disclaimer to claims 6, 7, 12, and 13, in said specification.

[*Official Gazette February 3, 1942.*]